United States Patent [19]

Lewis

[11] Patent Number: 4,616,360
[45] Date of Patent: Oct. 7, 1986

[54] PERIPHERAL CONTROL FOR A DIGITAL TELEPHONE SYSTEM

[75] Inventor: Conrad Lewis, Nepean, Canada

[73] Assignee: Mitel Corporation, Ontario, Canada

[21] Appl. No.: 577,496

[22] Filed: Feb. 6, 1984

[30] Foreign Application Priority Data

Jun. 29, 1983 [CA] Canada ............................ 431426

[51] Int. Cl.$^4$ .................... H04Q 11/04; H04J 3/02
[52] U.S. Cl. .............................. 370/67; 370/58; 370/85
[58] Field of Search ............... 370/58, 85, 67; 340/825.02

[56] References Cited

U.S. PATENT DOCUMENTS

| | | | |
|---|---|---|---|
| 3,693,155 | 9/1972 | Crafton et al. | 340/825.02 |
| 3,856,993 | 12/1974 | Closs et al. | 370/85 |
| 4,287,590 | 9/1981 | Boute et al. | 370/67 |
| 4,347,498 | 8/1982 | Lee et al. | 340/825.02 |
| 4,379,950 | 4/1983 | Ahmed | 370/58 |

Primary Examiner—Douglas W. Olms
Assistant Examiner—Wellington Chin
Attorney, Agent, or Firm—Antonelli, Terry & Wands

[57] ABSTRACT

This invention relates to a peripheral control unit for a digital switching system. It utilizes a peripheral control network formed of combination time and space division switches which communicate with peripheral cards using a number of time divided lines (channels of which correspond to peripheral units), and communication with the main system central control using a parallel bus connected to a controller and a transceiver, which is connected to the system control via serial time divided lines. In this manner a very few number of wires is required to be connected to the peripheral cards, while allowing selectively simple communication structure and high reliability.

19 Claims, 7 Drawing Figures

PERIPHERAL CONTROL FOR A DIGITAL TELEPHONE SYSTEM

FIELD OF THE INVENTION

This invention relates to a digital telephone system and particularly to apparatus for controlling peripheral units associated with the system.

BACKGROUND OF THE INVENTION

Digital telephone sytems are used to switch PCM encoded voice signals and computer or other data signals between peripheral units. These peripheral units can be standard analog telephones connected by CO-DECS (coder-decoders), digital telephones, computer terminals, tone generators, etc. The peripherals may be "dumb", that is, have passive or non-existent controllers, or may be "smart", containing their own controllers.

The telephone system typically is formed of a main controller which communicates with switching arrays which switch time divided multiplexed signals between peripherals.

In order to reduce the time overhead of the main controller, all or groups of the peripherals are often controlled by a peripheral controller, usually formed of a microprocessor with auxiliary circuitry. The main controller communicates with the peripheral controller which itself controls the peripherals. Activities undertaken by the peripheral controller are the regular scanning of scan points in the peripherals, the transmission of control signals to the peripherals and the transmission of supervisory signals from the peripherals to the main controller.

BRIEF DESCRIPTION OF THE DRAWINGS

There are several ways in which peripherals have been controlled by the peripheral controller, but suffer from problems as will be described below. However before describing the prior art techniques and the advantages of the present invention, reference is made to the drawings which will be used in conjunction with the description of the prior art and of the present invention to follow, to facilitate a better understanding of the invention, the drawings being.

DESCRIPTION OF RELATED ART

Figure 1:
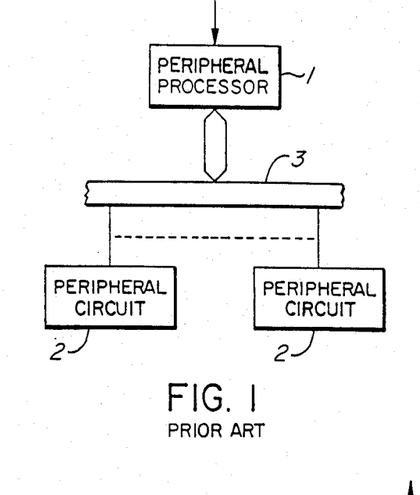
FIG. 1 is a block diagram of a prior art form of peripheral control circuit.

Turning to FIG. 1, one form of prior art peripheral control system is shown. A peripheral processor 1 communicates with a central control via channels or links (not shown), and communicates with peripheral circuits 2 via a parallel bus 3. This form of communication has been found to be relatively inexpensive and the software involved in controlling the communication has been found to be not particularly difficult to implement.

However it has been found that should one of the peripheral circuits fail in a manner which loads the bus, the entire bus can be rendered unusable. Thus it is clear that while the system is relative inexpensive and simple to implement, its reliability is not high.

Figure 2:
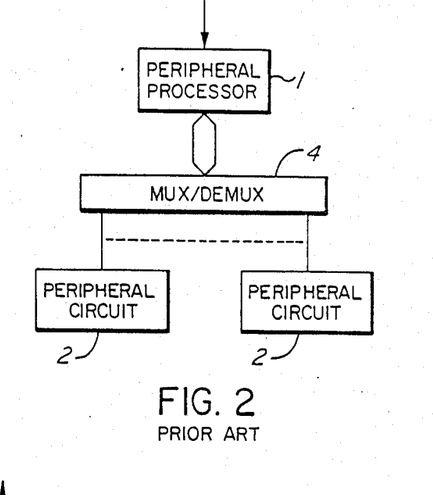
FIG. 2 is a block diagram of another prior art form of peripheral control circuit.

A second form of prior art peripheral control system is shown in FIG. 2. In this structure a peripheral processor 1 communicates with peripheral circuits 2 via a multiplexer/demultiplexer array 4. In this system there are individual serial lines connected from the multiplexer (demultiplexer) array to each peripheral circuit, i.e. a dedicated serial line for each. Consequently many hundreds of serial lines are used in a typical system.

While this form of system has been found to be more reliable than the parallel bus system, described above, clearly the difficulty of cabling increases as the number of peripherals increase, increasing the expense, and possibility of cross-talk. Further, the use of multiplexer/demultiplexer arrays has been found to be expensive and to require the use of complex software.

In addition to the above-noted deficiencies of each system, the peripheral processor must continuously be involved in transmitting control and superivsory signals as well as signals relating to a call.

The present invention is a system which considerably reduces the time overhead of the peripheral processor, thus providing a very dramatic advantage over the aforenoted two systems. Further, it has been found to be relatively inexpensive to implement and highly reliable. The failure of a peripheral circuit connected to the system will not disturb the operation of the remaining peripheral circuits. In addition, the number of long wires from the control system to the peripheral has been substantially reduced over the latter prior art system.

The invention is facilitated through the use of a combination time and space division switching element referred to herein as a DX switch. The DX switch combines the time and space division switching of time divided data channels, but also inherently stores the data until it is switched out and as well is self-refreshing. In a six DX switch array passing control information, a total of 768 peripherals can be controlled.

SUMMARY OF THE INVENTION

In general, the present invention is a peripheral control system for a digital signal switching system comprising apparatus for receiving peripheral control signals on a parallel bus from the switching system,, a plurality of serial lines, each for carrying time division multiplexed signals divided into channels, and switching apparatus for translating signals from the parallel bus into predetermined channels on predetermined ones of the lines for transmission to peripheral units, whereby each peripheral unit is allocated a particular channel on one of the lines, the number of peripheral units being a multiple of the number of lines.

The system can also operate in the opposite direction, supervisory signals received in specific channels on the lines from the peripheral units being translated and applied to the parallel bus. In addition, a similar switching matrix can transmit information signals between the time divided serial lines and other time divided serial lines connected to an information switching matrix of the main switching system. Both peripheral matrixes are under control of a single peripheral controller. The switching matrixes are preferably combination time and space division switching devices.

DESCRIPTION OF THE PREFERRED EMBODIMENT

Figure 3:
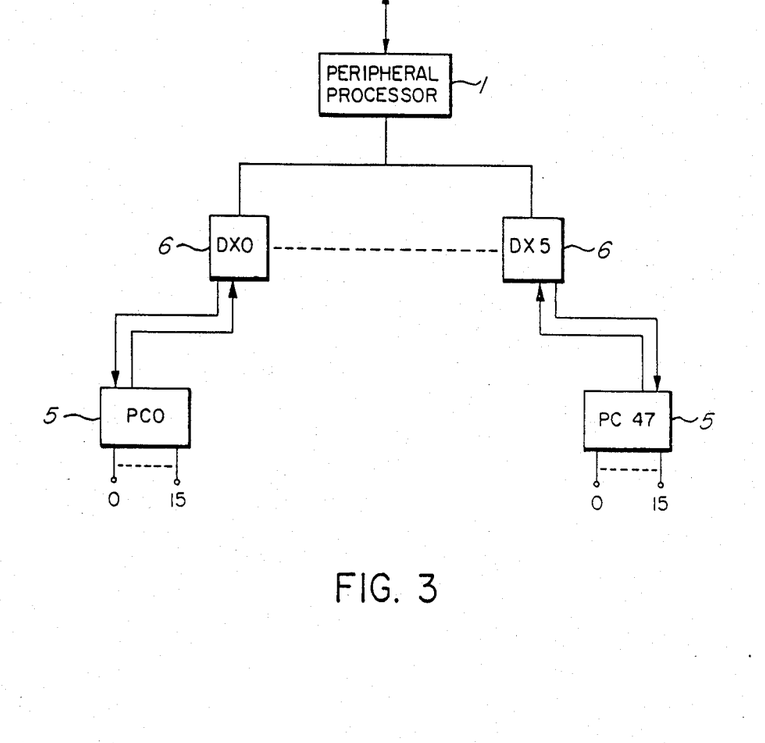
FIG. 3 is a block diagram of the present invention, FIGS. 4A and 4B form a block diagram of the DX-switch, the main switching element used in the preferred embodiment of this invention, FIGS. 5A and 5B form a detailed block diagram of the preferred embodiment of the present invention.

FIG. 3 is a general block diagram of the present invention. A peripheral processor 1 communicates with peripheral circuits 5 via DX switch circuits 6. The peripheral processor communicates with the very few DX switch circuits 6 via a parallel bus, and the DX switch circuits 6 communicate with the peripheral circuits 5 via dedicated bidirectional links. Each peripheral circuit is a printed circuit board on which is mounted up to e.g. 16 peripheral line circuits, each providing a peripheral port. Consequently the number of control lines from the DX switch circuits to the peripheral circuits corresponds to the number of boards, rather than to the number of peripherals, (i.e. one wire per board for each direction of transmission). Each line is time divided, carrying e.g. 16 channels, one channel per peripheral. Thus for 768 peripheral line circuits, each providing a peripheral port, there are only 32 control wires, rather than 768 or 1536 or a long parallel bus, as would be required in the prior art. It has been found that a reliable peripheral control circuit results, with relatively inexpensive to implement software, and few wires to the peripheral circuits, resulting in low cross-talk. The peripheral processor 1 communicates with the main digital switching system via a link which is not the subject of the present invention.

In the preferred embodiment, each of the DX switches communicates with eight separate peripheral circuits; six DX switches therefore communicate with forty-eight peripheral circuits. If each peripheral circuit contains up to sixteen ports, each for communicating with a specific peripheral unit up to 768 peripherals can be controlled.

Further, the peripheral unit can be either "dumb" or "smart" as described above; the DX switches and peripheral circuits are transparent to the control data which passes to the peripheral unit.

If a peripheral unit fails, only its port is disabled. If a peripheral circuit 5 fails, either only a single port or a maximum of sixteen ports will be disabled. If a DX switch circuit fails, only one peripheral circuit or a maximum of the total number connected to that DX switch circuit will be affected.

Consequently the failure of a single peripheral circuit will not disable all the peripheral circuits as in the circuit of FIG. 1, and the reliability is high, as in the system of FIG. 2. Yet the DX switch circuits are self-refreshing and automatically control the signal output paths to the various peripherals, thus relieving the peripheral processor 1 of a very large amount of its overhead. The peripheral processor can thus be applied to perform more tasks in the time available or to control more peripheral units. In any event the reliability is increased and/or the cost is decreased over prior art systems, for a given number of peripheral ports.

The DX switch circuit is comprised of apparatus for applying parallel control data into serial output lines and similarly for receiving serial input data and applying it to parallel lines, the parallel lines being connected to the peripheral processor 1. The DX switch circuit is described in Canadian patent application entitled TIME DIVISION SWITCHING MATRIX, Ser. No. 385,726, filed Sept. 11, 1981, invented by Conrad Lewis and assigned to Mitel Corporation. The specification thereof is incorporated herein by reference.

Figure 4A:
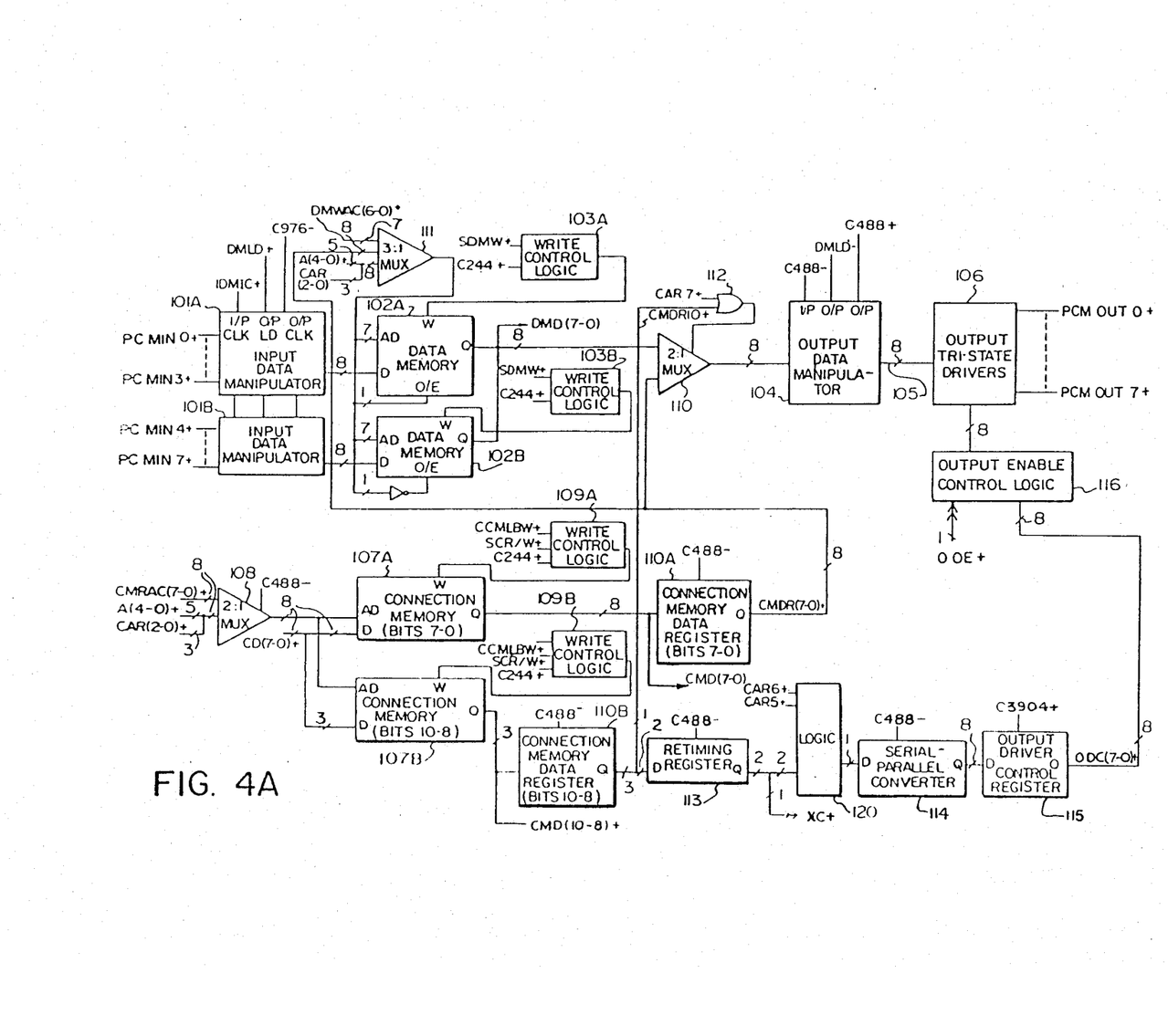
Figure 4B:
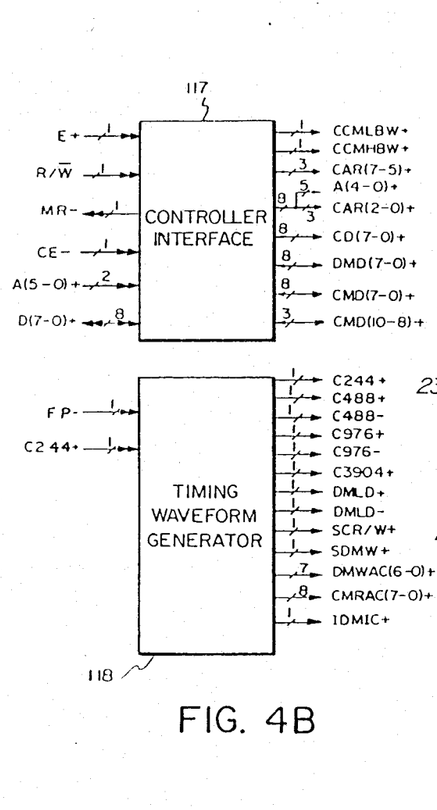

A description of the DX switch circuit follows, a block diagram thereof being shown in FIGS. 4A and 4B.

Turning to FIG. 4A, a plurality of input lines carrying time division multiplexed input signals, typically 8 lines in number referenced PCMIN0–PCMIN7 are connected to an input data manipulator, shown in two sections as 101A and 101B. The data on each input line destined for each peripheral is received in serial format, in which the time sequence of data is divided into frames, each frame being divided into 32 channels, and each channel being divided into 8 bits having a data word. In the manipulators 101A and 101B, the signals on each channel are converted from serial into parallel format. The resulting sequences of signals are applied via an 8 bit parallel link from each manipulator to the data D input of the two corresponding portions of a data memory 102A and 102B, referred to below as memory 102. The timing of the storage of this data in data memory 102 is controlled by write control logic circuits 103A and 103B, which are controlled by a pair of leads SDMW and CLK, clock source C244, both carrying timing waveforms generated in a timing waveform generator 118 (FIG. 4B). The memory portions could of course be combined, as could the input data manipulator portions and write control logic circuits. The data memory for the example shown is organized as 256×8 bits for storing one frame from each of the 8 input lines, each of which carries a 2.048 MHz serial data stream.

The output Q of data memory 102 is carried via an 8 bit parallel link through circuitry to be described later to an output data manipulator 104, which provides parallel to serial conversion. Manipulator 104 is operated by input, and output clock signals and output load timing signals applied to its I/P CLK, O/P CLK and O/P LD terminals respectively.

8 bit parallel output leads 105 from the manipulator 104 are connected to a corresponding number of tri-state switches or drivers 106, the outputs of which are connected to a group of 8 output leads PCMOUT0–PCMOUT7, each for carrying time division multiplexed output signals.

A 256×11 bit connection memory, conveniently organized into an 8 bit portion 107A and a 3 bit portion 107B has its 8 bit parallel data input terminals D connected to a source of data via leads CD (7-0) via a controller interface 117 (FIG. 4B) which is connected to a microprocessor controller (not shown). The 8 parallel address inputs AD are connected to the output of a 2:1 multiplexer 108, which has two 8 bit parallel inputs. One of the inputs is divided into two groups, one for receiving addresses on 5 parallel lines A(4-0) and one for receiving addresses on 3 parallel lines CAR(2-0), for connection to a microprocessor controller via controller interface 117. The other 8 bit parallel input is connected to a timing waveform source on leads CMRAC(7-0). Write control logic circuits 109A and 109B have their outputs connected to the write leads W of the respective connection memory 107A and 107B, and have as inputs timing signals on leads CCMLBW, SCR/$\overline{\text{W}}$, and CLK244.

The 8 bit and 3 bit parallel output leads from outputs Q of connection memory portions 107A and 107B are connected to the data inputs of a pair of corresponding connection memory data registers 110A and 110B. The output leads of connection memory portions 107A and 107B are also connected to the CMD(7-0) and CMD(10-8) inputs of a controller interface which is connected to a microprocessor controller (to be described later).

The leads connected to the outputs Q of data memory 102 are connected to the DMD(7-0) inputs of the controller interface 117 which is connected to the microprocessor controller.

Output bits 0-7 of the connection memory data register 110A are applied to a corresponding 8 bit parallel inputs to multiplexers 110 and 111. The second 8 bit input of multiplexer 110 is connected to the output of data memory 102, and the 8 bit parallel output of multiplexer 110 is connected to the input of parallel to serial output data manipulator 104. Seven of the 8 parallel output bits of multiplexer 111 are applied to the address AD input of data memory 102, while the eighth bit is applied to the output enable input of memory portion 102A, and the output enable input of memory portion 102B through an inverter 119. An 8 bit parallel second input of multiplexer 111 is connected to the address A(4-0) output and the memory address output CAR(2-0) of controller interface 117. In addition, a third 7 bit parallel input is connected to timing waveform generator 118 via lead DMWAC(6-0).

Output bits 8-10 of the connection memory data register 110B are applied to a three bit parallel input CMDR10 of OR gate 112. A second input of OR gate 112 is connected to a CAR7 lead from the controller interface 117. The output of OR gate 112 is connected to the input selection part of multiplexer 110, whereby either of the two inputs to the multiplexer can be selected.

The output leads from the connection memory data register portion 110B carrying bits 8 and 9 are connected to the input of a retiming register 113, from which the bits are passed through to logic circuit 120, and a single bit output lead thereof is connected to the input of serial to parallel converter 114. The bit 9 output lead of retiming register 113 referenced XC, is made available for control of an external circuit. Leads CAR6 and CAR5 from the controller interface 117 are connected to logic circuit 120.

Serial bits of the output lead from the connection memory data register 110 are converted in serial to parallel converter 114, and are applied in 8 bit parallel form from the output Q of converter 114 to an output driver control register 115. The output leads CDC(7-0) from register 115, which carry output driver control signals, are connected to corresponding inputs of an output enable control logic circuit 116, along with an output driver enable input lead ODE, which can be connected from external circuitry for forcing the output tri-state driver to a particular state from an external circuit. The output leads of output enable control logic 116 are connected to the control inputs of the output tri-state drivers 106.

A microprocessor controller interface circuit 117 interfaces the above described circuit to a microprocessor controller (not shown) via leads E, R/W, MR, CE, address bus leads A(5-0) and data bus leads D(7-0). The inputs to the controller interface 117 are the "data memory read" data leads DMD(7-0), of which there are 8, and the connection memory read data leads CMD(7-0) and CMD(10-8), of which there are 11. The outputs from controller interface 117 are the single individual controller connection memory low and high write enable leads CCMLBW and CCMHBW, 5 address bit leads A(4-0) controller address register bits CAR(2-0), controller address register bits CAR (7-5) specifying data and connection memory addresses, and 8 leads specifying connection memory input data CD(7-0).

In operation, input signals are received on leads PCMIN0-PCMIN7 and are converted from serial to parallel form in a serial to parallel converter in input data manipulator portions 101A and 101B. The parallel data is then written into a speech memory (i.e. data memory 102). An address memory, (i.e. connection memory 107), stores addresses of the data words to be read out to a parallel to serial converter corresponding to data manipulator 104, from where it is applied directly to the output lines PCMOUT0-PCMOUT7.

Thus the circuit performs both time switching and space switching of PCM encoded voice or data signals for and from the peripherals.

An associated microprocessor controller (not shown) has both read access to the data memory 102 and read and write access to the connection memory 107. Consequently while the data memory 102 stores one frame of 8 bit data words received on the 8 serial input links, any of this data can be read by the microprocessor controller. This is effected by the output of data memory 102 being connected via output leads DMD(7-0) from memory 102A to the input of controller interface 117. Thus data signals transmitted on the input PCM lines can be read by the microprocessor controller. Thus control signals input from the peripherals can be sent directly via the DX switch to the controller, from which it can be sent to a main system controller.

The microprocessor controller writes into the connection memory 107 via data leads CD(7-0) at addresses specified on leads A(4-0) and CAR(2-0) which are connected to multiplexer 108, and reads the contents of the connection memory via leads CMD(7-0) which are connected from the output of connection memory 107A to corresponding inputs of controller interface 117.

The microprocessor can also write directly to the output leads PCMOUT0-PCMOUT7 which lead to the peripheral interface (or to the main system switching network, in some cases) as follows. Signals from the connection memory are temporarily stored in data register portions 110A and 110B. The most significant 8 bits output from the connection memory data register 110A ((CMDR(7-0)) are applied to one of the parallel inputs of multiplexer 110, while the output bits of data memory 102 are applied to the other input. Since bit 10 from data register 110B with the bit on lead CAR7 from the microprocessor controller controls which of the two groups of inputs of multiplexer 110 are output therefrom to output data manipulator 104 and to the PCM output leads, it is clear that the microprocessor controller can substitute its own output signals on the output leads instead of the PCM words from data memory 102. In this way, data signals from the main system control can be sent to the peripheral via the peripheral controller without tying up trunks used to process the call leading to the system switching network.

In addition, input signals stored in data memory 102 from the input lines can be read via leads DMD(7-0) from the output of data memory 102 directly to the local microprocessor through the controller interface 117.

The signals stored in data memory 102 are normally designated to output PCM links and time slots by addresses specified by signals stored in the connection memory 107A, and which are input to multiplexer 111 via connection memory data register 110A and 8 bit parallel leads CMDR(7-0). In addition, the microprocessor can direct specific substitute words to be output from data memory 102 through memory address leads CAR(2-0) and A(4-0) which are input to multiplexer 111. A third source of signals to multiplexer 111 is timing signal lead DMWAC(6-0) which is connected from a timing waveform generator 118 (FIG. 4B).

The associated microprocessor writes 11 bit words (bits 0-10) into connection memory portions 107A and 107B at addresses specified on leads CAR(2-0) and A(4-0), at times specified by the write control logic circuits 109A and 109B, which issues write commands to the associated memory. Bit 10 of the connection memory is used to select either the data memory or bits 7-0 of the connection memory as the source of 8 bit words to be sent out on the serial output links. Depending on the state of bit 10, bits 7-0 either form the word to be transmitted via leads CMDR(7-0) and multiplexer 110 to the output data manipulator, or select one of the 256 8 bit words stored in the data memory to be transmitted on the corresponding output links during the corresponding channel time. As described earlier, bit 10 is passed through OR gate 112, which alters the state of multiplexer 110, defining the particular source of data which is enabled to pass therethrough to output data manipulator 104.

Bit 9 of the connection memory is used to control an external circuit. This bit is received from connection memory data register portion 110B, is corrected for phase in retiming register 113 with clock timing signal C488 and is made available on lead XC for control of external circuit.

Bit 8 passes from connection memory data register portion 110B through retiming register 113, through logic circuit 120 to serial to parallel converter 114, sequential bits being converted by serial to parallel converter 114 into 8 bit parallel form, which is stored in output driver control register 115. The output signal is applied to output enable control logic 116, from which it is applied to the gates of output tri-state drivers 106. The transmission and output impedance states of the tri-state drivers for corresponding output links are thereby specified.

When bit 10 is 0, bits 7-0 of the connection memory specify which one of the data memory words is to be sent out on the serial output link which corresponds to the connection memory location, during the channel time which corresponds to the connection memory location. Thus when bit 10 is 0, bits 7-0 are an address signal, which is applied from lead CMDR(7-0) through multiplexer 111 to the AD input of data memory 102.

When bit 10 is 1, bits 7-0 of the connection memory is the data word which is to be sent out on the serial output link which corresponds to the connection memory location, during the channel time which corresponds to the connection memory location. This word is passed through multiplexer 110 as described earlier.

The microprocessor controller thereby reads the serial input links from the data memory without concerning itself about frame, channel, and bit timing and serial to parallel conversion. By writing the connection memory, the microprocessor controller can transmit data words via the serial output links without concerning itself about timing and parallel-serial conversion.

It is thus clear that the DX switch can switch signals between incoming and outgoing channels on any of the incoming and outgoing lines, and can also transmit data to a microprocessor or receive data from a microprocessor and apply the data into any of the outgoing channels. The microprocessor, further, can control the switching paths within the DX switch. The DX switch thus forms a basic building block for the present invention.

Figure 5A:
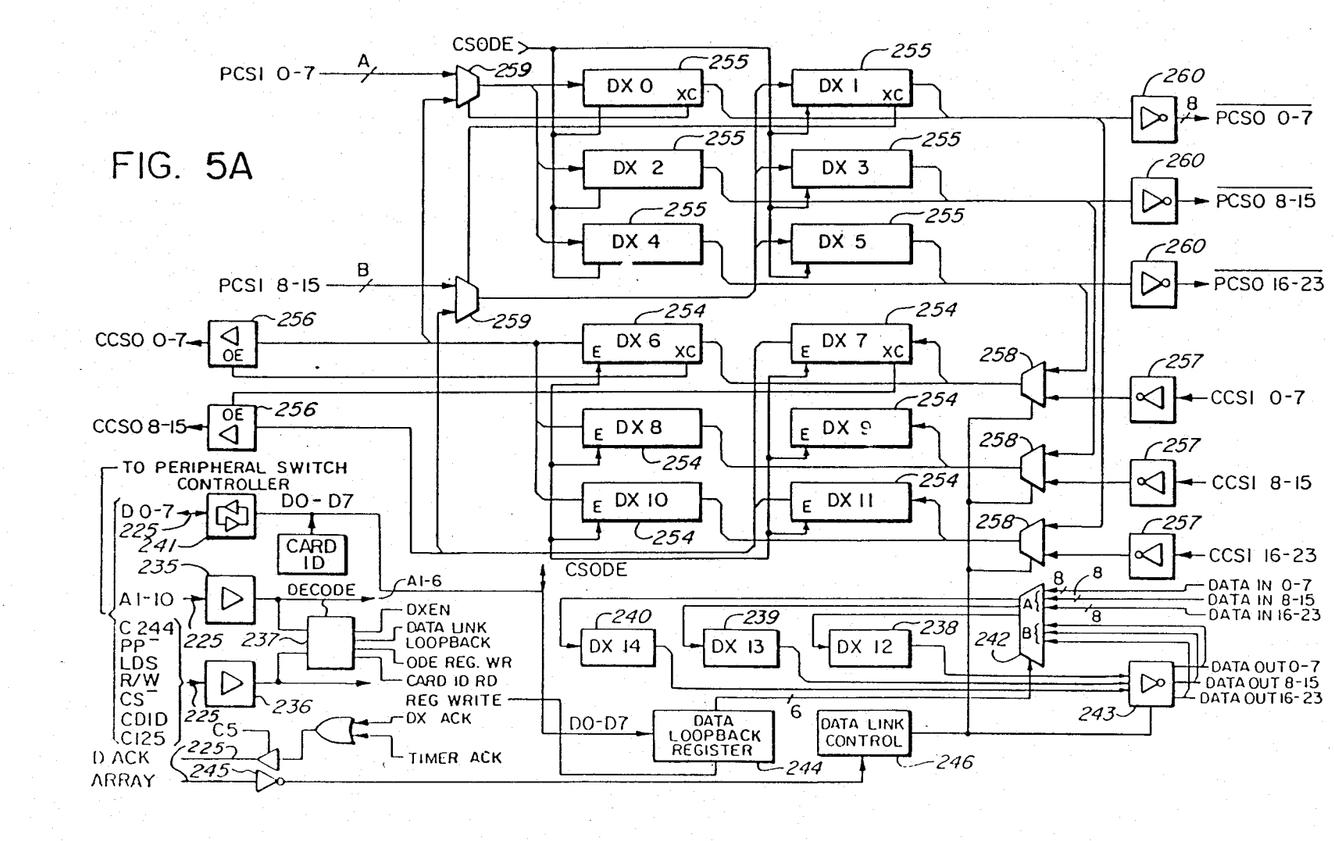
Figure 5B:
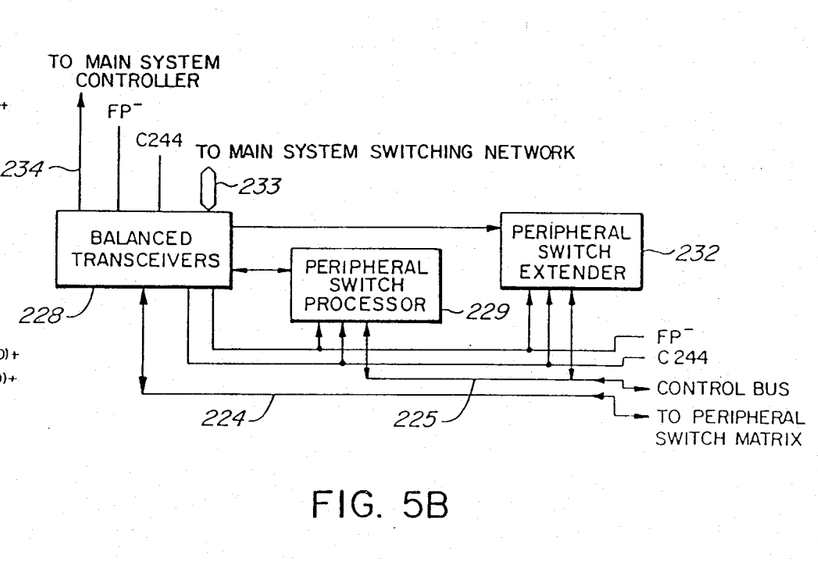

Turning now to FIGS. 5A and 5B, it is assumed that a peripheral interface card contains both call signal paths and paths to peripheral interface controllers or controllers related to the peripheral units themselves. Thus dedicated bi-directional data links DATA IN 0-7, DATA IN 8-15, DATA IN 16-23, DATA OUT 0-7, DATA OUT 8-15 and DATA OUT 15-23 interconnect peripheral interface circuits as also do dedicated bidirectional call or information signal transmission links $\overline{\text{PCS 0-7}}$, $\overline{\text{PCS 8-15}}$, $\overline{\text{PCS 16-23}}$, CCS 0-7, CCS 8-15 and CCS 16-23. The peripheral switch matrix in one prototype performed traffic concentration from 48 bidirectional PCM links of 32 channels from the peripheral side into 8 or 16 bidirectional links of 32 channels which lead to the main switching system switching network.

The peripheral switch processor (FIG. 5B) communicates via control bus 225 which is shown in FIG. 5A as constituting data leads D0-7, address leads A1-10 as well as leads C244, FP-LBS, R/W, CS-, CDID and C125 (being clock, frame pulse, load, read/write, chip select, and clock leads), as well as a data acknowledge (DACK) and array enable leads. The peripheral switch processor 229 contains programs to cause the DX switches to continuously scan the peripheral interface cards connected to the lines on the peripheral side of the DX switches. Of course the function of scanning is well known. However in the present case the use of a group of DX switches of the type described with reference to FIGS. 4A and 4B in the present form o circuit is believed to be novel.

The peripheral switch processor 229 outputs control signals on the control bus 225 which are passed through buffers 235 and 236, are decoded in decoder 237 and emerge on a bus labelled DXEN (DX chip enable), DATA LINK LOOP BACK (not used in this embodiment), ODE REG WR and card ID RD (card identification read). The DX enable, and other leads from the peripheral switch processor 239 interface the controller interface and timing waveform generator described earlier of each of the three 8×8 DX switches 238, 239 and 240. Similarly the data lines D0-D7 are connected through a bidirectional buffer 241, its D0-D7 output lines being connected to the controller interface of the three DX switches. The data input lines from the peripheral interface, DATA IN 0-7, DATA IN 8-15 and DATA IN 16-23 are connected to one phase input of multiplexer 242, which has its three outputs connected to the PCM IN 0-7 input lines respectively of the DX chips 238-240. The PCM OUT 0-7 lines of the three DX chips are connected to three inputs of a buffer 243 which has its three outputs connected to the data output lines DATA OUT 0-7, DATA OUT 8-15 and DATA OUT 16-23 to the peripheral interfaces. Accordingly a bidirectional transmission link is set up between the peripheral switch processor (FIG. 5B) and the data output and data input lines to the peripheral interface circuits via the three DX chips 238, 239 and 240.

In operation the peripheral switch processor 229 outputs a signal which is passed into the connection memory and then into the data memory of the three DX chips, which output scanning signals on the data output leads to the peripheral interface circuits via the PCM time divided serial lines DATA OUT 0–23. Assuming that a peripheral telephone has gone off-hook, a predetermined format supervisory signal is received from the peripheral circuit via one of the channels on the data input leads DATA IN 0–23, multiplexer 242, and is stored in the data memory of the corresponding DX switch. The data memory contents of the DX switches are passed back to the peripheral switch processor via the data memory output DMLD lead, the data signal then passing via buffer 241 to the parallel control bus 225. The processor outputs the data (reformatting it if desired), applying it to the transceiver 228 for transmission along a serial link to the main system controller.

In the above manner the peripheral switch processor continuously scans the channels allocated to the peripheral units for changes of state, other supervisory signals or messages (from intelligent peripherals) designated for the main system controller.

Assuming that the peripheral switch processor has detected a signal stored in the data memory of one of the DX switches 238–240 which indicates that a particular peripheral has gone off hook, it formats the message and stores it in a software buffer for transmission via a transceiver 228 and a serial line to the main system controller.

It should also be noted that the peripheral switch processor has utilized the controller interface to the DX chips 238–240 to transmit scan control messages out on the PCM links from the DX switches. Since the channels and links are dedicated for the peripherals, the particular scan signal format and peripheral state message format can be set up in whatever format is desired. For example, the format can be formed of a byte designating "type of message", forming part of the first byte, a control byte, placed as the last byte which can have portions designating the protocol and protocol control bits, and the remaining bytes containing the message such as the addresses of the sender and receiver, a function code, data bytes, a checksum, etc. The message, typically 18 bytes in length, can contain one or more function codes designating a numerical representation of a function to be performed and a number of data bytes that this function can use as parameters. The number of bytes to follow the function code can be indicated by the code itself, i.e. one code can indicate that three bytes of data may follow while another code may not require any data at all.

It will be noted that the data output lines of buffer 243 are connected to the second phase input of multiplexer 242. Multiplexer 242 is enabled on either of its phase A or phase B control inputs via a signal received from a data loop back register 244, which receives data control signals via buffer 241 from an input signal, decoded by the peripheral switch processor. When a predetermined signal is received by the data back loop register 244, it causes multiplexer 242 to connect signals carried by the output leads of the buffer 243 to the phase B input of multiplexer 242, thereby providing a facility whereby a signal received either from the peripheral switch processor (via the parallel bus) or the peripheral interface circuits may be looped back and stored in the data memory of the DX switches 238, 299 and 240. This can be used for testing, latching of data in the local memory for repetitive transmission, etc.

A signal from the parallel bus 224 on the ARRAY lead is also applied via an inverter 245 to a data link control circuit 246 which controls the state of each of the output line passing through buffer 43, leading to the peripheral circuits.

While the above has described the peripheral unit control system, information signals are also transmitted between peripheral units and the main switching system switching network via a small number of time divided lines. The lines connected to the peripheral circuits are PCSO 0–23 for transmission of signals thereto and the incoming lines from the peripheral circuits are CCSI 0–23. The signals received from the main switching system switching network are on lines PCSI 0–15, while the lines carrying signals to the main switching system switching network are labelled CCSO 0–15. The signals received by the peripheral switch processor cause it to set up time and space division links between channels of the PCM input lines CCSI 0–23, through one of an array of DX switches 254, to designated channels of output lines CCSO 0–15. The output line is connected through one of buffers 256. The input paths CCSI 0–23, having input channels receiving signals from a specific peripheral for reception of PCM voice, dialling signals or the like, are connected through input buffers 257, loop back multiplexers 258 (the latter not used as such in this invention) to one of the input PCM lines of the DX switch 254 matrix. Upon receipt of a signal via the peripheral processor, DX switches 54 are caused to connect a particular input channel from one of the CCSI 0–23 lines to a particular output channel on the CCSO 0–15 lines, the control signals being stored in the connection memory of the DX switches, and the information signal being stored in the data memory of the DX switches 254 in a similar manner as described earlier.

Similarly, a signal is received by the peripheral controller to set up an appropriate time and space divided link between input lines PCSI 0–15 and output lines PCSO 0–23, through the DX switch array formed of DX switches 255. The PCM input ports of the DX switches are connected from input leads PCSI 0–15 through multiplexers 259 (not used as such in this invention). The output PCM links of DX switches 255 are connected through output buffers 250 to output links PCSO 0–23, the specific channels of which form links to peripherals.

Accordingly an information signal path can be set up between a peripheral unit (e.g. a telephone which has gone off-hook) through DX switch array 254 on any one of the output links CCSO 0–15 to the main switching system switching network, a link leading to one of the serial input leads PCSI 0–15 through one of the DX switches 255, via one of the output leads 0–23 to the peripheral, on one of the output channels.

The two switching arrays formed of time and space division switches 254 and 255 form a concentration function, as well as a channel line switching function and a multiplexing switching function. As in the control portion described earlier, a substantial reduction in the number of lines leading to the peripheral units is achieved.

The data signals to be transmitted on the lines to the peripheral circuits, or which are received from the peripheral circuits are thus temporarily stored in the random access memories of the DX switch circuits. Since the inputting and outputting of these data signals is controlled within of the DX siwtch circuits, i.e. using their own microprocessor, it is clear that they are self-refreshing. Consequently there is no time or software overhead required in the peripheral processor or in the main system controller for performing this function.

In addition, since the peripheral unit destination code for each channel is stored in each of the DX switch circuit, once this data has been loaded into the DX switch circuits, the peripheral processor can attend to other tasks. This further reduces its time and software overhead. In some prior art systems, fully 40% of the peripheral processor time is used for refreshing. Accordingly it is estimated that the cost of peripheral control in the present invention as compared to previous systems which require refreshing activity by the peripheral processor is nearly halved.

As well, the number of long wires running to the peripheral units is low due to the time division multiplexing of channels of data destined for various peripheral units on a group of lines, reducing crosstalk and increasing reliability, while the ease of software provision obtained by the use of bus oriented software is achieved. Thus the advantages described earlier with respect to prior art and systems are obtained, while the disadvantages are avoided.

A person skilled in the art understanding this invention may now conceive of other embodiments or variations thereof, using the principles described herein. All are considered to be within the sphere and scope of this invention as defined in the claims appended hereto.

I claim:

1. A peripheral control system for a digital signal switching system comprising:
   (a) means for receiving peripheral unit control signals on a parallel bus,
   (b) a plurality of serial lines, each for carrying time division multiplexed signals divided into channels,
   (c) switching means for translating said control signals from the parallel bus into predetermined channels on predetermined ones of the lines for transmission to peripheral units, whereby each peripheral unit is allocated a particular channel on one of said lines, the number of peripheral units being a multiple of the number of lines.

2. A peripheral control system as defined in claim 1, in which the switching means is comprised of at least one combination time and space division switching matrix having a parallel bus input for connection to the parallel bus and a plurality of time division multiplexed output lines for connection to said peripheral units.

3. A peripheral control system as defined in claim 2 in which the switching matrix is comprised of a memory for storage of said control signals, and a microprocessor for controlling the operation of said switching matrix whereby said control signals are read from said memory and are transmitted in predetermined channels on predetermined lines for reception by predetermined peripheral units.

4. A peripheral control system as defined in claim 1 further including a plurality of serial lines, each for carrying time division multiplexed supervisory signals divided into channels, received from said peripheral units, signals from an individual peripheral being confined to a channel, the switching means being adapted to translate said supervisory signals from said peripheral units and apply them to the parallel bus for transmission to a controller of the digital switching system.

5. A peripheral control system as defined in claim 1 further including a plurality of serial lines, each for carrying time division multiplexed supervisory signals divided innto channels, received from said peripheral units, signals from an individual peripheral being confined to a channel, the switching means being adapted to translate said supervisory signals from said peripheral units and apply them to the parallel bus for transmission to a controller of the digital switching system, and a receiver-transmitter unit connected to the parallel bus for receiving signals via serial line from a controller of the digital switching system and applying them to the parallel bus, and for receiving signals from the parallel bus and transmitting them via a serial line to a controller of the digital switching system.

6. A peripheral control system for a switching system comprising:
   (a) means for receiving and transmitting supervisory signals to and/or from one or a plurality of peripheral units,
   (b) means for receiving and transmitting information signals to and/or from said peripheral units,
   (c) at least one combination time and space divided peripheral switching network interconnecting said means for receiving and transmitting said supervisory signals and said means for receiving and transmitting said information signals,
   (d) a plurality of lines connected to said network each carrying a plurality of time divided serial data transmission channels carrying said supervisory and information signals for and/or from a group of peripheral units, the channels being allocated to the peripheral units on an individual basis.

7. A peripheral control system as defined in claim 6, in which the switching network includes transceivers for receiving and transmitting said supervisory signals, a processor controlling said switching network, a parallel bus system interconnecting the transceivers, processor and switching network, and means for receiving and transmitting said supervisory signals via said switching network and bus system between the transceivers and peripheral units under control of the processor.

8. A peripheral control system as defined in claim 7, including a plurality of links each carrying time divided serial data transmission channels connected to the switching network for receiving and transmitting said information signals between said peripheral switching network and an information signal switching network for said switching system.

9. A peripheral control system as defined in claim 8, in which the switching network is comprised of two separate time and space divided switching subnetworks, one subnetwork being connected between said links and a plurality of time divided serial data transmission links for switching information signals therebetween and having a prallel bus interface connected to the controller for receiving subnetwork control signals therefrom for control thereof, the other subnetwork having a parallel bus interface connected to the controller via said parallel bus system and also being connected to a plurality of time divided serial supervisory data transmission links, for switching supervisory signals between the peripheral units and the transceivers under control of the controller.

10. A peripheral control system as defined in claim 9 in which said one subnetwork is comprised of at least one combination time and space division data switch including means for storing said information signals, means for storing network control and other signals received via the parallel bus interface, and means for cyclically reading the stored information signals and applying them to predetermined output links in predetermined time channels as defined by said stored control signals.

11. A peripheral control system as defined in claim 10, in which said switch in said one subnetwork is comprised of means for applying predetermined ones of said other signals to predetermined output links in predetermined time channels as defined by said stored control signals.

12. A peripheral control system as defined in claim 10 in which said other subnetwork is comprised of at least one combination time and space division switch, including means for storing control and supervisory signals received via the parallel bus interface, reading said supervisory signals and applying them to predetermined output links in predetermined time channels as defined by said stored control signals.

13. A peripheral control system as defined in claim 10 in which said outer subnetwork is comprised of at least one combination time and space division switch, including means for storing control and supervisory signals received via the parallel bus interface, reading said supervisory signals and applying them to predetermined output links in predetermined time channels as defined by said stored control signals, and means for reading supervisory signals from the peripheral units, storing them, and applying them to the parallel bus at predetermined times as defined said stored control signals.

14. A peripheral control system as defined in claim 2 further including a plurality of serial lines, each for carrying time division multiplexed supervisory signals divided into channels, received from said peripheral units, signals from an individual peripheral being confined to a channel, the switching means being adapted to translate said supervisory signals from said peripheral units and apply them to the parallel bus for transmission to a controller of the digital switching system.

15. A peripheral control system as defined in claim 3 further including a plurality of serial lines, each for carrying time division multiplexed supervisory signals divided into channels, received from said peripheral units, signals from an individual peripheral being confined to a channel, the switching means being adapted to translate said supervisory signals from said peripheral units and apply them to the parallel bus for transmission to a controller of the digital switching system.

16. A peripheral control system as defined in claim 2 further including a plurality of serial lines, each for carrying time division multiplexed supervisory signals divided into channels, received from said peripheral units, signals from an individual peripheral being confined to a channel, the switching means being adapted to translate said supervisory signals from said peripheral units and apply them to the parallel bus for transmission to a controller of the digital switching system, and a receiver-transmitter unit connected to the parallel bus for receiving signals via serial line from a controller of the digital switching system and applying them to the parallel bus, and for receiving signals from the parallel bus and transmitting them via a serial line to a controller of the digital switching system.

17. A peripheral control system as defined in claim 3 further including a plurality of serial lines, each for carrying time division multiplexed supervisory signals divided into channels, received from said peripheral units, signals from an individual peripheral being confined to a channel, the switching means being adapted to translate said supervisory signals from said peripheral units and apply them to the parallel bus for transmission to a controller of the digital switching system, and a receiver-transmitter unit connected to the parallel bus for receiving signals via serial line from a controller of the digital switching system and applying them to the parallel bus, and for receiving signals from the parallel bus and transmitting them via a serial line to a controller of the digital switching system.

18. A peripheral control system as defined in claim 11 in which said other subnetwork is comprised of at least one combination time and space division switch, including means for storing control and supervisory signals received via the parallel bus interface, reading said supervisory signals and applying them to predetermined output links in predetermined time channels as defined by said stored control signals.

19. A peripheral control system as defined in claim 11 in which said other subnetwork is comprised of at least one combination time and space division switch, including means for storing control and supervisory signals received via the parallel bus interface, reading said supervisory signals and applying them to predetermined output links in predetermined time channels as defined by said stored control signals, and means for reading supervisory signals from the peripheral units, storing them, and applying them to the parallel bus at predetermined times as defined said stored control signals.

* * * * *